(12) United States Patent
Mori et al.

(10) Patent No.: US 8,272,474 B2
(45) Date of Patent: Sep. 25, 2012

(54) ELECTRIC POWER STEERING SYSTEM

(75) Inventors: Yutaka Mori, Toyohashi (JP);
Yoshiyuki Shibata, Toyota (JP)

(73) Assignee: Jtekt Corporation, Osaka (JP)

( * ) Notice: Subject to any disclaimer, the term of this patent is extended or adjusted under 35 U.S.C. 154(b) by 27 days.

(21) Appl. No.: 12/833,312

(22) Filed: Jul. 9, 2010

(65) Prior Publication Data
US 2011/0024224 A1 Feb. 3, 2011

(30) Foreign Application Priority Data

Jul. 31, 2009 (JP) .................................. 2009-179236

(51) Int. Cl.
*B62D 5/04* (2006.01)
(52) U.S. Cl. ........................... 180/446; 180/443; 701/41
(58) Field of Classification Search .................. 180/443, 180/444, 446; 701/41, 42
See application file for complete search history.

(56) References Cited

U.S. PATENT DOCUMENTS

| | | | |
|---|---|---|---|
| 6,266,591 B1 | 7/2001 | Wilson-Jones et al. | |
| 7,559,405 B2 * | 7/2009 | Kumaido et al. | 180/446 |
| 2006/0022619 A1 | 2/2006 | Koike et al. | |
| 2008/0199160 A1 | 8/2008 | Yamazaki | |
| 2009/0187312 A1 * | 7/2009 | Nozawa et al. | 701/42 |
| 2010/0057300 A1 | 3/2010 | Nishiyama | |
| 2010/0126795 A1 * | 5/2010 | Tokunaga | 180/446 |

FOREIGN PATENT DOCUMENTS

| | | |
|---|---|---|
| DE | 100 31 215 A1 | 10/2001 |
| DE | 101 28 068 A1 | 1/2003 |
| DE | 102 61 001 A1 | 7/2004 |
| EP | 1 772 349 A2 | 4/2007 |
| EP | 1 864 886 A2 | 12/2007 |
| JP | A-06-008839 | 1/1994 |
| JP | A-2008-024277 | 2/2008 |

OTHER PUBLICATIONS

European Search Report dated Feb. 2, 2011 in corresponding European Patent Application No. 10171241.2.

* cited by examiner

*Primary Examiner* — Lesley D Morris
*Assistant Examiner* — Marc Scharich
(74) *Attorney, Agent, or Firm* — Oliff & Berridge, PLC

(57) ABSTRACT

In an electric power steering system, when a motor rotation angular speed ω and a motor rotation angular acceleration α of a steering assisting motor both exceed corresponding predetermined values ωs and αs, respectively, an abnormal external force application-determining section determines that an external force equal to or greater than a predetermined value is applied to a steering mechanism, and sets an abnormal external force application determination flag (FLG) to 1. When the abnormal external force application determination flag (FLG) is 1, a d-axis electric current command value-calculating section activates a motor rotation angular speed-reducing section and performs field-strengthening control based on a motor rotation speed/d-axis electric current command value map.

9 Claims, 9 Drawing Sheets

ELECTRIC POWER STEERING SYSTEM

INCORPORATION BY REFERENCE

The disclosure of Japanese Patent Application No. 2009-179236 filed on Jul. 31, 2009 including the specification, drawings and abstract is incorporated herein by reference in its entirety.

BACKGROUND OF THE INVENTION

1. Field of the Invention

The invention relates to an electric power steering system.

2. Description of the Related Art

An electric power steering system has been developed, in which a vehicle speed is detected by a vehicle speed sensor, a steering torque applied to a steering wheel is detected by a torque sensor, a steering assisting motor is driven by being energized with a driving electric current whose value is determined according to the steering torque and the vehicle speed detected, and the force required to steer a vehicle is assisted by the torque of the motor to provide a driver with a comfortable steering feeling.

There is a case where an unexpected load is applied to a constituent member of the electric power steering system due to an erroneous operation performed by the driver while the vehicle is running. This is, for example, a situation where a steered wheel of the vehicle hits a curbstone at the edge of a roadway. When a steered wheel of the vehicle hits the curbstone, an external force is applied to the steered wheel and there is a possibility that the steered wheel is forcibly steered in one direction. When the steered wheel is forcibly steered, the rack shaft, which is a constituent element of the steering system, is forcibly moved in the axial direction. Depending on how the steered wheel hits the curbstone, there is a case where a base portion of a tie rod at an end of the rack shaft hits a mechanical stopper at a high speed, which is provided to prevent the rack shaft from moving beyond the allowable moving range in the axial direction.

When the base portion of the tie rod at an end of the rack shaft hits the mechanical stopper, an inertial force of the rotary shaft of the steering assisting motor is applied to a constituent part of the torque transmitting system as an impulsive force. Thus, there is a possibility that a large impulsive force is applied to constituent parts of the torque transmitting system, such as a speed reducing portion that reduces the speed of rotation of the motor and a steering shaft, which can cause a failure.

Japanese Patent Application Publication No. 6-8839 (JP-A-6-8839) describes a system, in which when the steering speed becomes equal to or higher than a predetermined setting value of the steering speed, a clutch is disengaged and the inertial force of an electric motor is therefore not transmitted to a steering mechanism, so that the inertial force of the electric motor is not added to the steering force occurring in the steering system when a curbstone is hit.

However, the system described in JP-A-6-8839 requires a clutch mechanism and therefore, the structure is complicated and the manufacturing costs are high.

Japanese Patent Application Publication No. 2008-24277 (JP-A-2008-24277) describes a system, in which when the rate of change in the motor torque detected by a motor torque detector is equal to or higher than a threshold value that is used to determine whether the steering limit position is reached, it is determined that a duty factor limiting condition is satisfied, and the duty factor of the pulse width modulation signal is fixed at a predetermined value that is used to restrict the torque that is transmitted to a torque transmitting member between a steered wheel and a steering shaft of the steering mechanism. According to this system, the steering assisting torque produced by the electric motor is limited before an excessive torque is transmitted to a torque transmitting member, such as an intermediate shaft, that is interposed between the steering shaft and a steering gear. Thus, it is possible to suppress the impulsive force that is transmitted to the torque transmitting member when the steering limit position is reached, such as when a tire hits a curbstone, without providing an additional steering angle sensor, an additional torque limiter, etc.

In addition, JP-A-2008-24277 describes a system, in which when the rate of change in the motor torque detected by a motor torque detector is equal to or higher than a threshold value that is used to determine whether the steering limit position is reached, the duty factor is fixed at a predetermined value to suppress the impulsive force that is transmitted to a torque transmitting member when the steering limit position is reached, such as when a steered wheel hits a curbstone. When the steering limit position is reached after the steered wheel hits the curbstone, however, it is impossible to surely suppress the impulsive force that is transmitted to the torque transmitting member because even when the electric current is limited as described above, the motor is rotating at a speed equal to or higher than a no-load rotation speed.

SUMMARY OF THE INVENTION

An object of the invention is to provide an electric power steering system capable of solving the above problem. An electric power steering system according to an aspect of the invention includes: a motor that applies a steering assisting force to a steering mechanism; an electric current command value-calculating section that calculates an electric current command value that is used to control the motor; a motor control signal generating section that outputs a motor control signal based on the electric current command value calculated by the electric current command value-calculating section; a motor drive circuit that outputs electric power for drive to the motor based on the motor control signal; an abnormal external force application-determining section that determines whether an abnormal external force equal to or greater than a predetermined value is applied to the steering mechanism; and a motor rotation angular speed-reducing section that outputs a speed reduction command value that is used to reduce a rotation angular speed of the motor when the abnormal external force application-determining section determines that the abnormal external force is applied.

When it is determined that an external force equal to or greater than a predetermined value is applied to the steering mechanism, the speed reduction command value is output and the motor rotation angular speed is reduced. Thus, the impulsive force that is transmitted to a torque transmitting member that is a constituent element of the steering mechanism, is suppressed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
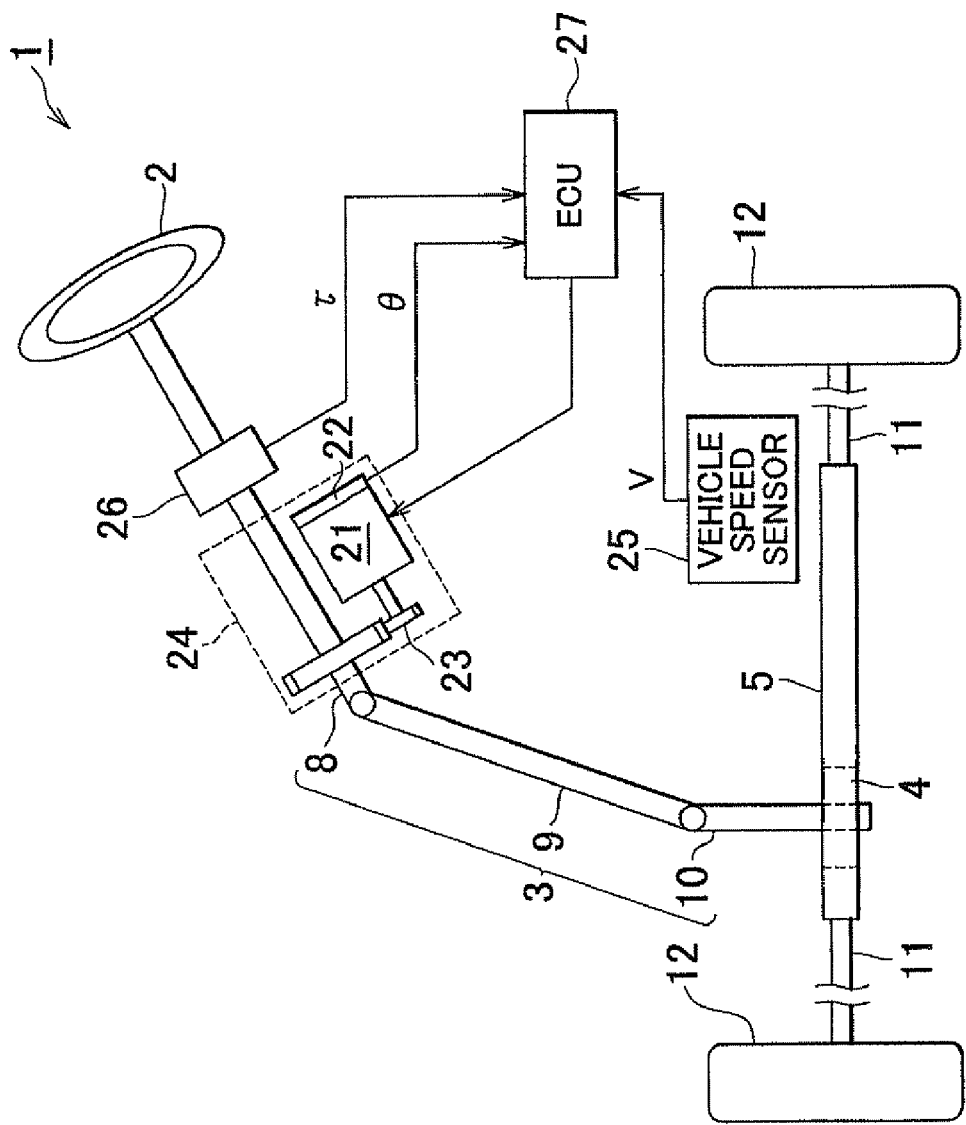
FIG. 1 is a schematic configuration diagram of an electric power steering system.

An embodiment of the invention in the form of a column-assisted electric power steering system (hereinafter referred to as the "EPS") will be described below with reference to drawings. As shown in FIG. 1, in the EPS 1, a steering shaft 3, to which a steering wheel 2 is fixed, is connected to a rack shaft 5 through a rack and pinion mechanism 4, so that the rotation of the steering shaft 3 caused by a steering operation is converted into a reciprocation of the rack shaft 5 via the rack and pinion mechanism 4. The steering shaft 3 is formed by connecting a column shaft 8, an intermediate shaft 9, and a pinion shaft 10. The reciprocation of the rack shaft 5 caused by rotation of the steering shaft 3 is transmitted to knuckles (not shown) via tie rods 11 connected to both ends of the rack shaft 5, so that the steering angle of steered wheels 12 is changed.

The EPS 1 includes: an EPS actuator 24, which functions as a steering assist device that applies an assisting force to assist steering operation to the steering system with the use of an electric motor 21 as a drive power source; and an electric control unit (ECU) 27, which functions as a controller that controls the operation of the EPS actuator 24.

The EPS actuator 24 is a column-assisted EPS actuator and the motor 21, which functions as the drive power source thereof, is connected to the column shaft 8 via a reduction gear 23. The speed of rotation of the motor 21 is reduced by the reduction gear 23 and transmitted to the column shaft 8 and the torque of the motor is applied to the steering system as the assisting force.

A vehicle speed sensor 25, a torque sensor 26, and a motor rotation angle sensor 22 are connected to the ECU 27. The ECU 27 detects a vehicle speed V, a steering torque τ, and a motor rotation angle θ, based on output signals from these sensors.

The torque sensor 26 is a twin resolver-type torque sensor. The ECU 27 calculates the steering torque τ based on output signals from a pair of resolvers provided on both ends of a torsion bar (not shown). The ECU 27 is configured to calculate the target assisting force based on the detected state quantities and control the operation of the EPS actuator 24, that is, the assisting force applied to the steering system, by controlling the supply of the electric power for drive to the motor 21, which functions as the drive power source.

Figure 2:
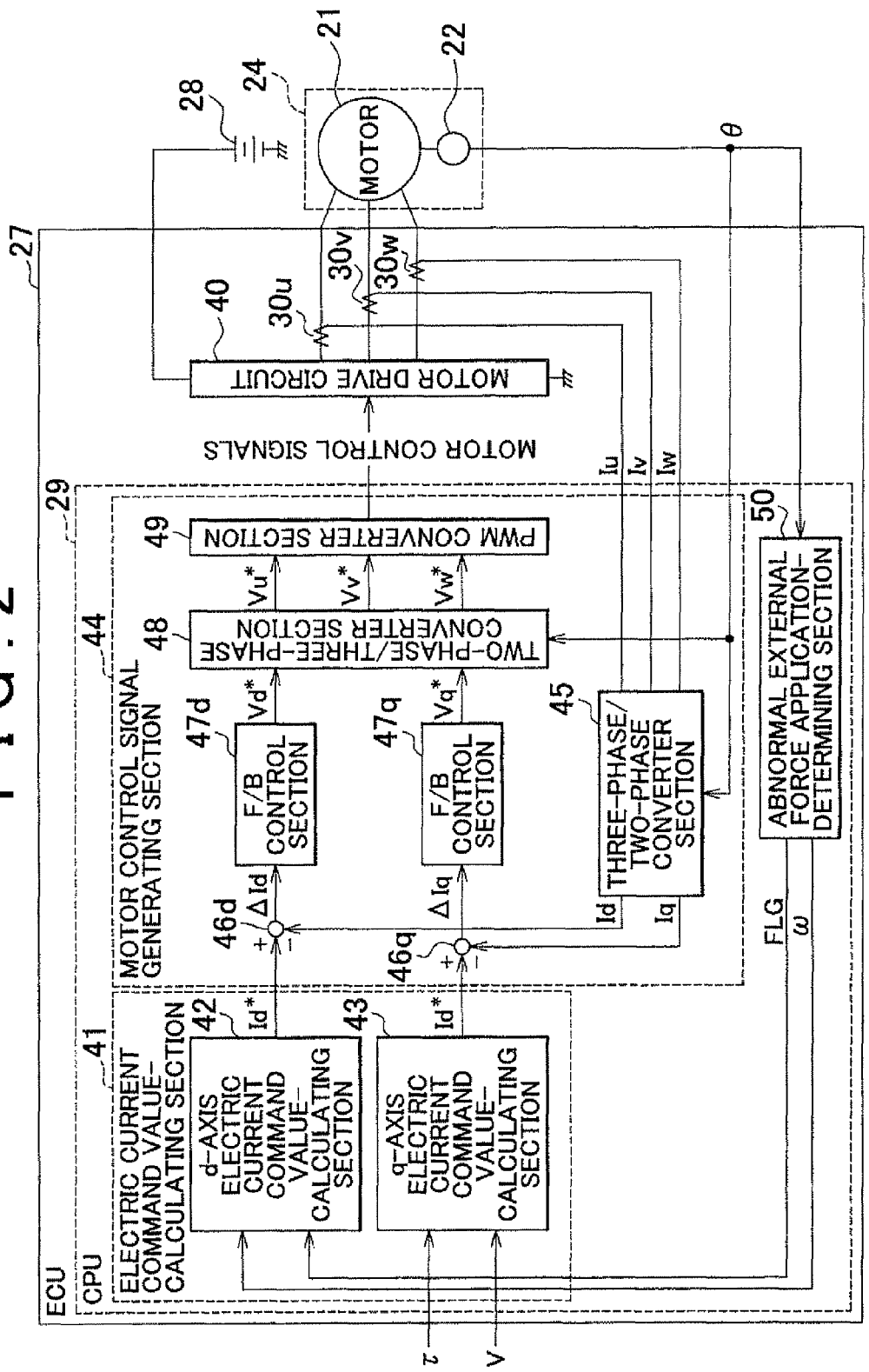
FIG. 2 is a control block diagram of the electric power steering system.

Next, the electrical configuration of the EPS of this embodiment will be described. FIG. 2 is a control block diagram of the EPS. As shown in FIG. 2, the ECU 27 includes a central processing unit (CPU) 29, which functions as a motor control signal output section that outputs motor control signals, and a motor drive circuit 40 that supplies three-phase electric power for drive to the motor 21, which functions as the drive power source of the EPS actuator 24, based on the motor control signals.

The motor drive circuit 40 is a pulse width modulation (PWM) inverter (not shown), in which each pair of switching devices that are connected in series forms a unit (arm) and three arms corresponding to the respective phases are connected to each other in parallel. The motor control signals output from the CPU 29 determine the duty factor of each of the switching devices constituting the motor drive circuit 40. The motor control signals are applied to the gate terminals of the switching devices and the switching devices are thus turned on and off in response to the motor control signals, whereby the three-phase electric power for driving the motor is generated using the supply voltage of a battery 28 and is output to the motor 21.

Connected to the ECU 27 are electric current sensors 30$u$, 30$v$, and 30$w$ for detecting the phase current values Iu, Iv, and Iw for energization of the motor 21, and the motor rotation angle sensor 22 that detects the rotation angle θ of the motor 21. The CPU 29 outputs the motor control signals to the motor drive circuit 40 based on the phase current values Iu, Iv, and Iw and the motor rotation angle θ of the motor 21, the steering torque τ, and the vehicle speed V, which are detected based on the output signals from the above sensors.

The control blocks described below are implemented by the computer program executed by the CPU 29. The CPU 29 detects the above state quantities in a predetermined sampling cycle and executes, at predetermined intervals, the arithmetic operations in the respective control blocks described later, thereby generating the motor control signals.

As shown in FIG. 2, the CPU 29 includes: an electric current command value-calculating section 41 that calculates an electric current command value that is used to control the motor 21; and a motor control signal generating section 44 that generates the motor control signals that are used to control the motor drive circuit 40; and an abnormal external force application-determining section 50 that determines whether an external force equal to or greater than a predetermined value is applied to a steering mechanism.

As shown in FIG. 2, the abnormal external force application-determining section receives the motor rotation angle θ from the motor rotation angle sensor 22. The abnormal external force application-determining section obtains a motor rotation angular speed ω by differentiating the motor rotation angle θ received, and obtains a motor rotation angular acceleration α by differentiating the motor rotation angular speed ω. The result of calculation is stored in a memory (not shown). The abnormal external force application-determining section compares the motor rotation angular speed ω and the motor rotation angular acceleration a with the predetermined values ωs and αs, respectively, which are stored as threshold values in the memory in advance. As a result, when the motor rotation angular speed ω and the motor rotation angular acceleration α both exceed the corresponding predetermined values ωs and αs, respectively, the abnormal external force application-determining section determines that an external force equal to or greater than the predetermined value is applied to the steering mechanism, and sets an abnormal external force application determination flag (FLG) to 1. On the other hand, when at least one of the motor rotation angular speed ω and the motor rotation angular acceleration α is less than the corresponding predetermined values αs and/or ωs, the abnormal external force application-determining section determines that the external force equal to or greater than the predetermined value is not applied to the steering mechanism, and sets the abnormal external force application determination flag (FLG) to 0.

The above described operation for determining whether the abnormal external force is applied made by the abnormal external force application-determining section is an example mode. The abnormal external force application-determining section may be such that, when the motor rotation angular speed ω becomes equal to or higher than the corresponding predetermined value ωs or when the motor rotation angular acceleration α becomes equal to or higher than the predetermined value αs, the abnormal external force application-determining section determines that an abnormal external force is applied.

The electric current command value-calculating section 41 includes: a q-axis electric current command value-calculating section 43 that calculates the electric current command value as the control target value of the assisting force applied to the steering system; and a d-axis electric current command value-calculating section 42 that calculates the electric current command value as the control target value of the strengthened magnetic force that is applied to the motor 21.

The q-axis electric current command value-calculating section 43 calculates a q-axis electric current command value Iq* in the d/q coordinate system based on the steering torque and the vehicle speed V detected by the torque sensor 26 and the vehicle speed sensor 25, and outputs the calculated q-axis electric current command value Iq* to the motor control signal generating section 44.

Figure 6:
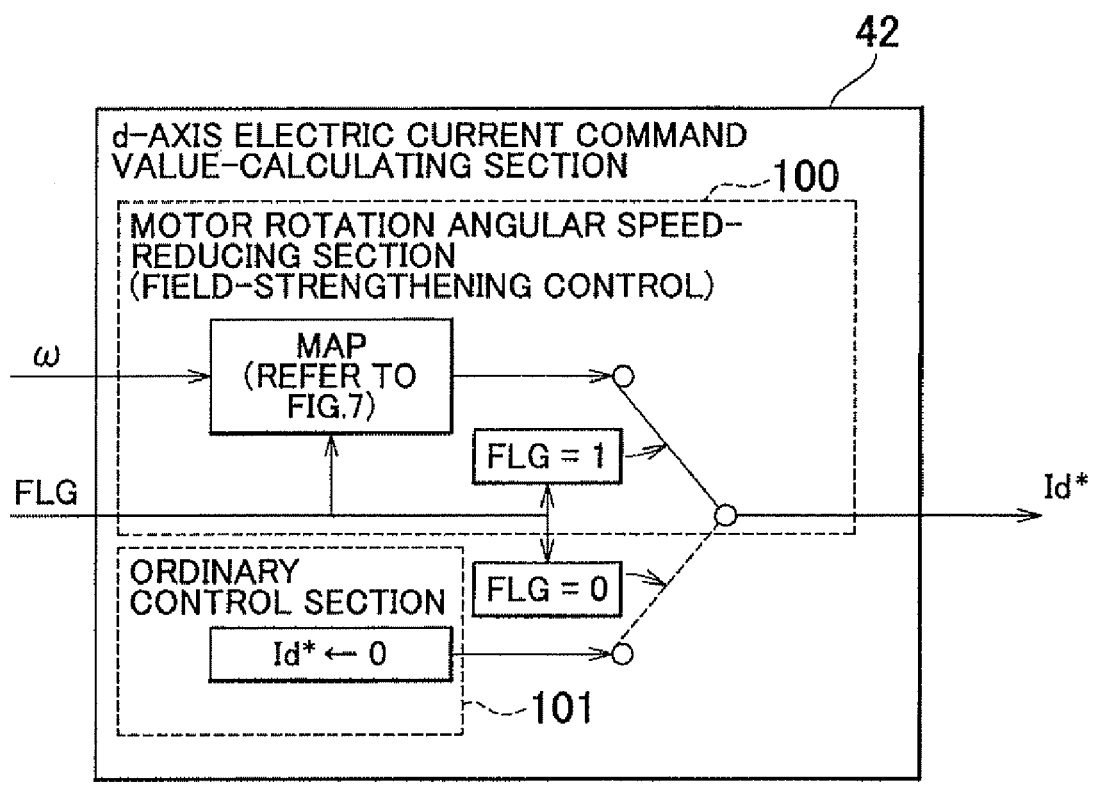
FIG. 6 is a block diagram of a d-axis electric current command value-calculating process.

As shown in FIG. 6, the d-axis electric current command value-calculating section 42 includes a motor rotation angular speed-reducing section 100 that performs field-strengthening control and a ordinary control section 101 that sets the value of a d-axis electric current command value Id* to 0 and thus does not perform the field-strengthening control. The d-axis electric current command value-calculating section 42 receives the abnormal external force application determination flag (FLG) from the abnormal external force application-determining section 50. When the abnormal external force application determination flag (FLG) received is 1, the d-axis electric current command value-calculating section 42 activates the motor rotation angular speed-reducing section 100. When the abnormal external force application determination flag (FLG) is 0, the d-axis electric current command value-calculating section 42 deactivates the motor rotation angular speed-reducing section 100 and activates the ordinary control section 101. The motor rotation angular speed-reducing section 100 has a motor rotation speed/d-axis electric current command value map shown in FIG. 7. The d-axis electric current command value Id* corresponding to a motor rotation speed is determined according to this map.

As shown in FIG. 2, the motor control signal generating section 44 includes a three-phase/two-phase converter section 45, subtracters 46d and 46q, feedback (F/B) control sections 47d and 47q, two-phase/three-phase converter section 48 and a PWM converter section 49.

The three-phase/two-phase converter section 45 receives the motor rotation angle θ detected by the motor rotation angle sensor 22, along with the phase current values Iu, Iv, and Iw detected by the electric current sensors 30u, 30v, and 30w. The three-phase/two-phase converter section 45 converts the phase current values Iu, Iv, and Iw into a d-axis electric current value Id and a q-axis electric current value Iq in the d/q coordinate system, based on the motor rotation angle θ.

The subtracter 46d receives the d-axis electric current command value Id* calculated in the d-axis electric current command value-calculating section 42 and the d-axis electric current value Id obtained through conversion in the three-phase/two-phase converter section 45. The subtracter 46d calculates a d-axis electric current deviation ΔId based on the d-axis electric current command value Id* and the d-axis electric current value Id received. Similarly, the subtracter 46q receives the q-axis electric current command value Iq* calculated in the q-axis electric current command value-calculating section 43 and the q-axis electric current value Iq obtained through conversion in the three-phase/two-phase converter section 45. The subtracter 46q calculates a q-axis electric current deviation ΔIq based on the q-axis electric current command value Iq* and the q-axis electric current value Iq received.

The F/B control section 47d receives the d-axis electric current deviation ΔId from the subtracter 46d. The F/B control section 47q receives the q-axis electric current deviation ΔIq from the subtracter 46q. The F/B control sections 47d and 47q perform feedback control so as to cause the d-axis electric current value Id and the q-axis electric current value Iq that are actual electric current values, to follow the d-axis electric current command value Id* and the q-axis electric current command value Iq* that are control target values.

Specifically, in the F/B control section 47d, the d-axis electric current deviation ΔId received from the subtracter 46d is multiplied by a predetermined F/B gain (PI gain) to calculate a d-axis voltage command value Vd*. Similarly, in the F/B control section 47q, the q-axis electric current deviation ΔIq received from the subtracter 46q is multiplied by a predetermined F/B gain (PI gain) to calculate a q-axis voltage command value Vq*.

The two-phase/three-phase converter section 48 receives the d-axis voltage command value Vd* and the q-axis voltage command value Vq* from the F/B control sections 47d and 47q, respectively and receives the motor rotation angle θ detected by the motor rotation angle sensor 22. The two-phase/three-phase converter section 48 converts the d-axis voltage command value Vd* and the q-axis voltage command value Vq* into three-phase voltage command values Vu*, Vv*, and Vw*, based on the motor rotation angle θ.

The PWM converter section 49 receives the voltage command values Vu*, Vv*, and Vw* obtained through conversion in the two-phase/three-phase converter section 48. The PWM converter section 49 generates the duty command values corresponding to the voltage command values Vu*, Vv*, and Vw* to generate the motor control signals having the duty factors indicated by the duty command values.

Specifically, the motor control signal generating section 44 receives the phase current values Iu, Iv, and Iw detected by the electric current sensors 30u, 30v, and 30w and the motor rotation angle θ detected by the motor rotation angle sensor 22, along with the q-axis electric current command value Iq* and the d-axis electric current command value Id* output by the electric current command value-calculating section 41. The motor control signal generating section 44 performs the electric current feedback control in the d/q coordinate system based on the phase current values Iu, Iv, and Iw and the motor rotation angle θ to generate the motor control signals.

The CPU 29 outputs the motor control signals generated by the motor control signal generating section 44 to the gate terminals of the switching devices constituting the motor drive circuit 40 to control the operation of the motor drive circuit 40, that is, the supply of the electric power for drive to the motor 21.

Figure 7:
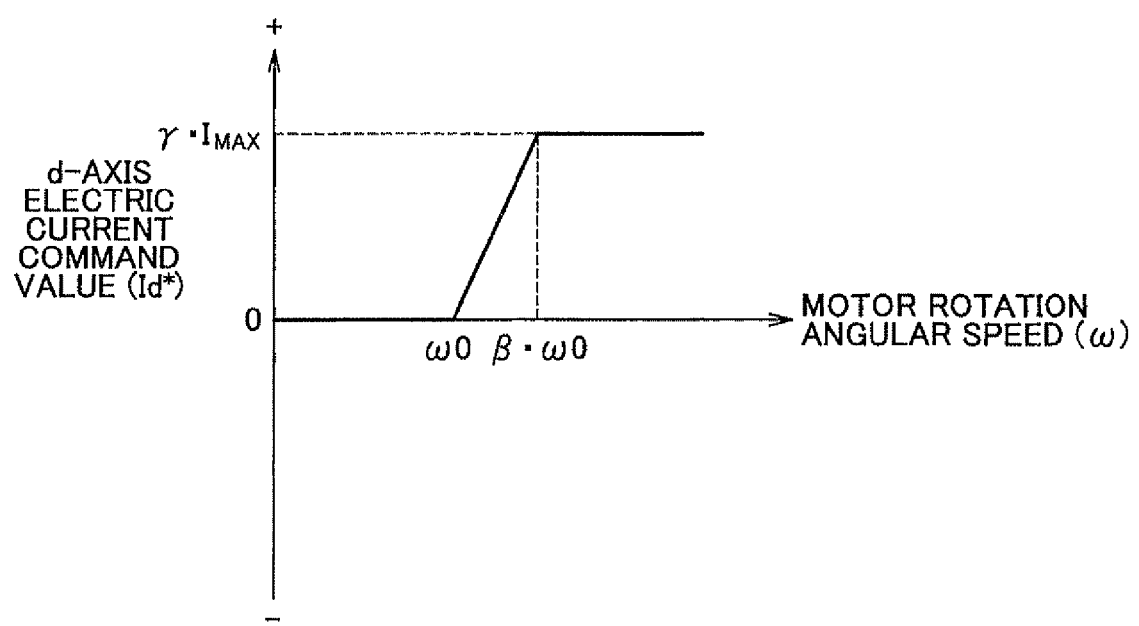
FIG. 7 is an explanatory diagram for illustrating a mode of field strengthening.

Next, the motor rotation speed/d-axis electric current command value map that is used to perform field-strengthening control, shown in FIG. 7, will be explained. The horizontal axis of the map indicates the motor rotation angular speed $\omega$ and the vertical axis indicates the d-axis electric current command value Id*. When the motor rotation angular speed exceeds a predetermined value $\omega 0$, a predetermined d-axis electric current command value Id* that is positive in the d-axis direction is output. When the motor rotation angular speed exceeds the predetermined value $\omega 0$ and is increasing, the d-axis electric current command value Id* is also increased to achieve the field strengthening. Although the d-axis electric current command value Id* is increased to achieve the field strengthening, the rapid change in the steering feeling is suppressed because the d-axis electric current command value Id* is not sharply changed but gradually increased.

When the motor rotation angular speed increases and exceeds a predetermined value $\beta \cdot \omega (\beta > 1)$, the d-axis electric current command value Id* is limited. The limit value is $\gamma \cdot I_{MAX}$, for example. The $I_{MAX}$ is the maximum value of electric current that is allowed to flow through the ECU. By limiting the d-axis electric current value, it is possible to suppress the heat generation in the motor caused by the d-axis electric current.

When the motor rotation angular speed detected starts decreasing from the maximum motor rotation angular speed, the d-axis electric current command value is gradually reduced with the use of the same map as the above map.

Figure 3:
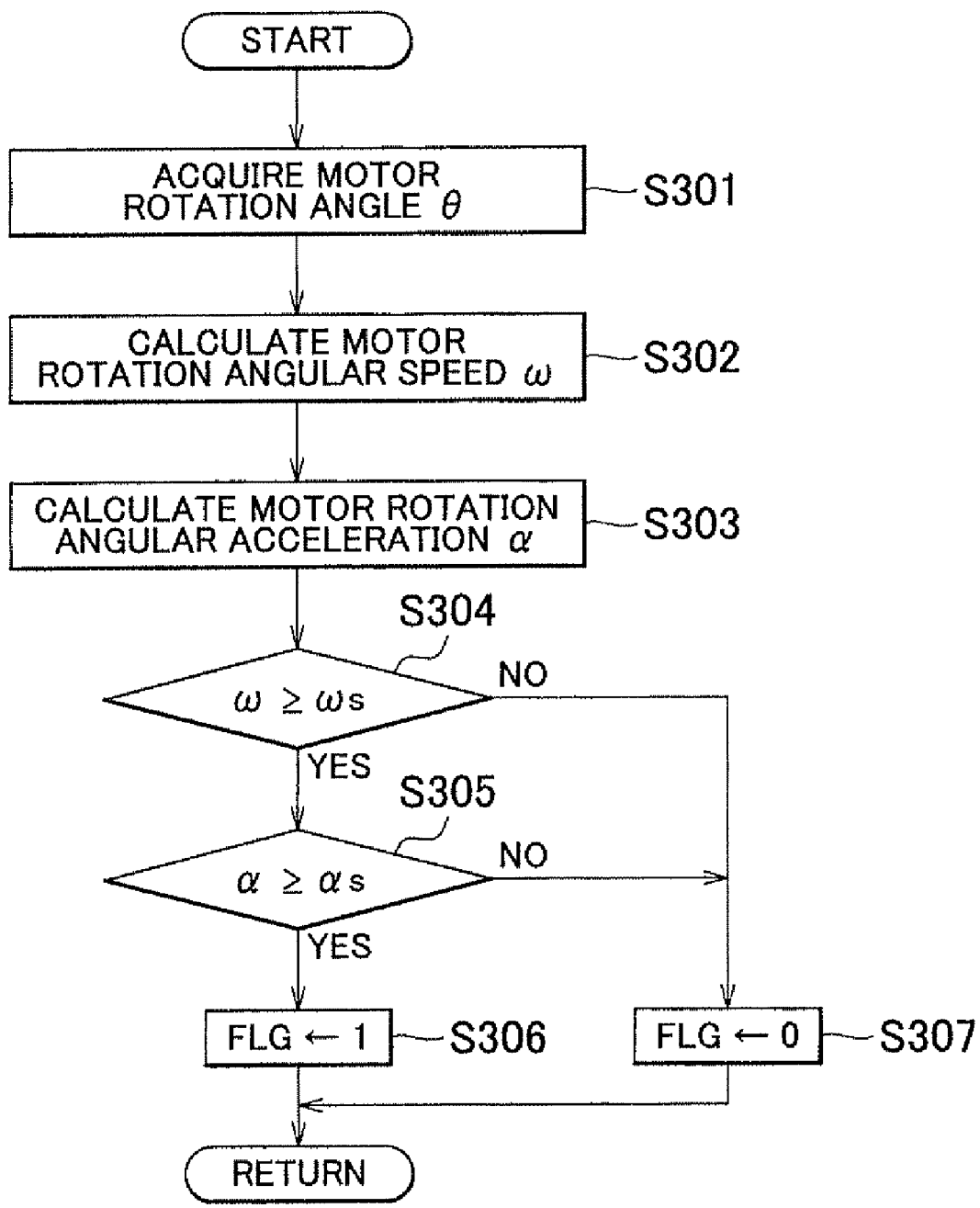
FIG. 3 is a flow chart of an abnormal external force application-determining process.

Next, a procedure of the steps that are performed by the abnormal external force application-determining section of this embodiment will be described with reference to a flow chart shown in FIG. 3. First, the motor rotation angle $\theta$ is acquired (step S301). Subsequently, the motor rotation angle $\theta$ is differentiated to calculate the motor rotation angular speed $\omega$ (step S302). Subsequently, the motor rotation angular acceleration $\alpha$ is calculated by differentiating the motor rotation angular speed $\omega$ (step S303). Then, it is determined whether the calculated motor rotation angular speed $\omega$ is equal to or higher than the predetermined value $\omega s$ (step S304). When it is determined that the motor rotation angular speed $\omega$ is equal to or higher than the predetermined value $\omega s$ (YES in step S304), it is determined whether the motor rotation angular acceleration a calculated is equal to or higher than the predetermined value $\alpha s$ (step S305). When the motor rotation angular acceleration $\alpha$ is equal to or higher than the predetermined value $\alpha s$ (YES in step S305), it is determined that an abnormal external force is applied, and the value "1" is written into the abnormal external force application determination flag (FLG: memory, not shown, in the ECU 27) (step S306) and the process returns.

When it is determined in step S304 that the motor rotation angular speed $\omega$ is lower than the predetermined value $\omega s$ (NO in step S304) or it is determined in step S305 that the motor rotation angular acceleration $\alpha$ is lower than the predetermined value $\alpha s$ (NO in step S305), it is determined that the abnormal external force is not applied, the value "0" is written into the abnormal external force application determination flag (FLG: memory, not shown, in the ECU 27) (step S307), and the process returns.

Figure 4:
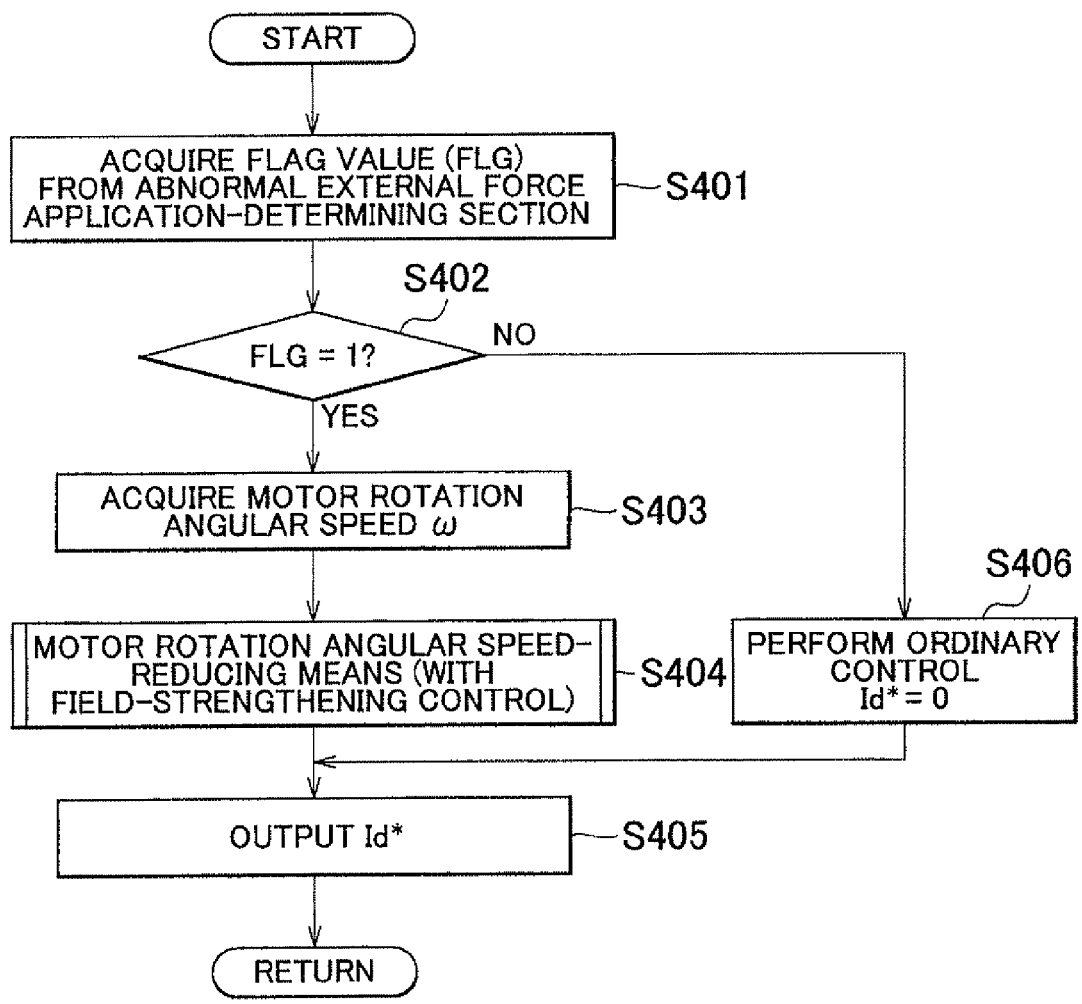
FIG. 4 is a flow chart of an electric current command value-calculating process.

Next, a procedure of the steps that are performed by the d-axis electric current command value-calculating section of this embodiment will be described with reference to a flow chart shown in FIG. 4. First, the d-axis electric current command value-calculating section acquires the abnormal external force application determination flag (FLG) output from the abnormal external force application-determining section (step S401). Next, it is determined whether the abnormal external force application determination flag (FLG) is 1 (step S402). When the abnormal external force application determination flag (FLG) is 1 (YES in step S402), the d-axis electric current command value-calculating section acquires the motor rotation angular speed $\omega$ (step S403) and the motor rotation angular speed-reducing section calculates the d-axis electric current command value Id* based on the field-strengthening control (step S404). Next, the d-axis electric current command value Id* is output to the motor control signal generating section 44 (step S405) and the process returns.

When it is determined in step S402 that the abnormal external force application determination flag (FLG) is not 1 (NO in step S402), the field-strengthening control that is performed by the motor rotation angular speed-reducing section is not performed and ordinary control (Id*=0) is performed (step S406). Next, the d-axis electric current command value Id* is output to the motor control signal generating section 44 (step S405) and the process returns.

Figure 5:
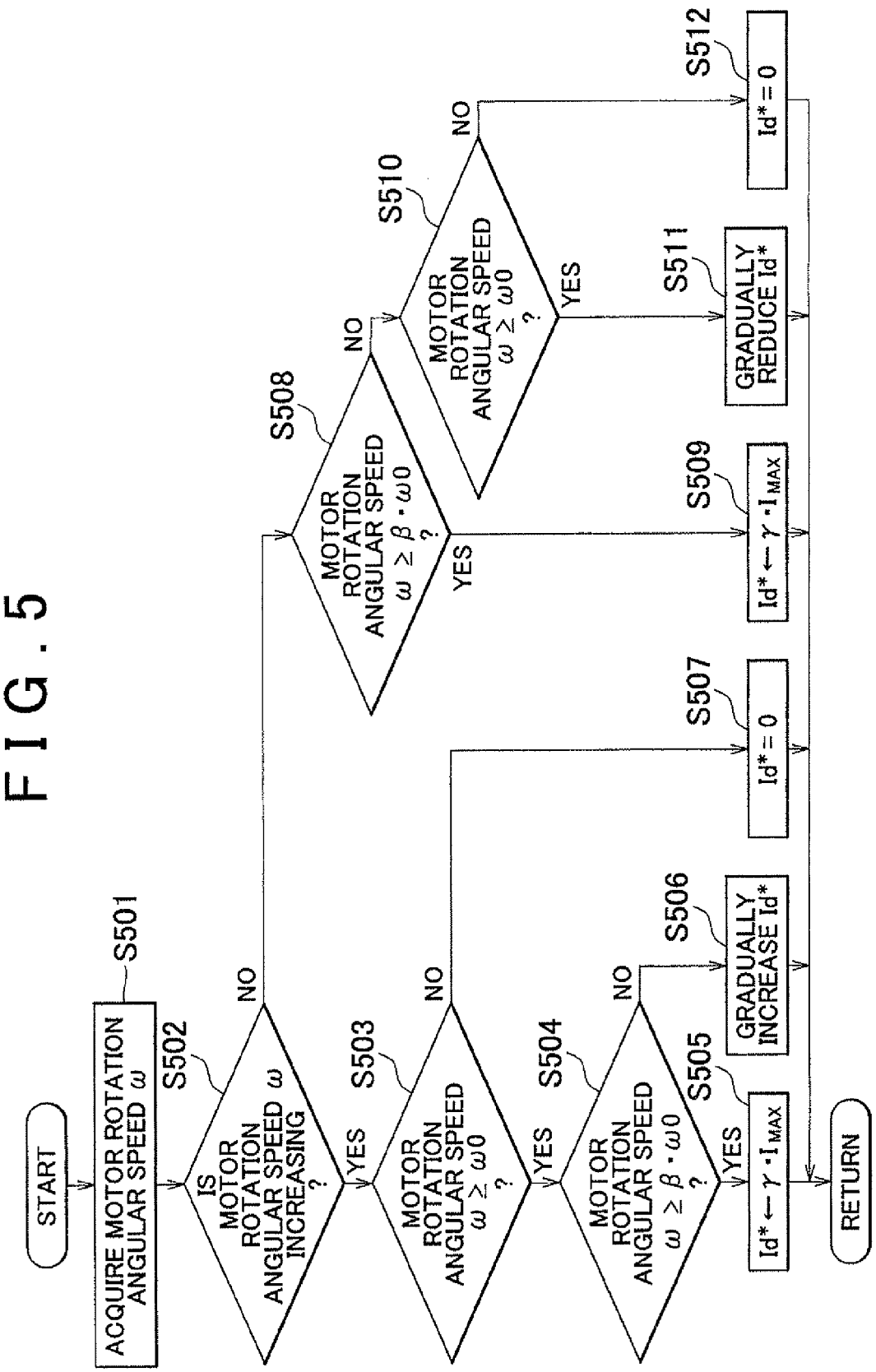
FIG. 5 is a flow chart of a motor rotation angular speed-reducing process.

Next, a procedure of the field-strengthening control that is performed by the motor rotation angular speed-reducing section of this embodiment will be described with reference to a flow chart shown in FIG. 5. First, the motor rotation angular speed-reducing section acquires the motor rotation angular speed $\omega$ (step S501). Next, it is determined whether the motor rotation angular speed $\omega$ is increasing (step S502). This determination as to whether the motor rotation angular speed $\omega$ is increasing is made by, for example, comparing the motor rotation angular speed acquired in the preceding execution of the process with the motor rotation angular speed acquired in the current execution thereof. When it is determined that the motor rotation angular speed $\omega$ is increasing (YES in step S502), it is determined whether the motor rotation angular speed $\omega$ is equal to or higher than $\omega 0$ (step S503). When it is determined that the motor rotation angular speed is equal to or higher than $\omega 0$ (YES in step S503), it is determined whether the motor rotation angular speed is equal to or higher than $\beta \cdot \omega 0$ (step S504). When it is determined that the motor rotation angular speed is equal to or higher than $\beta \cdot \omega 0$ (YES in step S504), the d-axis electric current command value Id* is set as the electric current limit value ($\gamma \cdot I_{MAX}$, for example) (step S505) and the process returns.

When it is determined in step S504 that the motor rotation angular speed is lower than $\beta \cdot \omega 0$ (NO in step S504), the d-axis electric current command value Id* is gradually increased (step S506) and the process returns. When it is determined in step S503 that the motor rotation angular speed is lower than $\omega 0$ (NO in step S503), the d-axis electric current command value Id* is set to zero (step S507) and the process returns.

When it is determined in step S502 that the motor rotation angular speed $\omega$ is not increasing (NO in step S502), it is determined whether the motor rotation angular speed $\omega$ is equal to or higher than $\beta \cdot \omega 0$ (step S508). When it is determined that the motor rotation angular speed $\omega$ is equal to or higher than $\beta \cdot \omega 0$ (YES in step S508), the d-axis electric current command value Id* is set to the electric current limit value, that is, $\gamma \cdot I_{MAX}$, for example (step S509) and the process returns. When it is determined that the motor rotation angular speed $\omega$ is lower than $\beta \cdot \omega 0$ (NO in step S508), it is determined whether the motor rotation angular speed $\omega$ is equal to or higher than $\omega 0$ (step S510). When it is determined that the motor rotation angular speed $\omega$ is equal to or higher than $\omega 0$ (YES in step S510), the d-axis electric current command value Id* is gradually reduced (step S511) and the process returns. When it is determined that the motor rotation angular speed $\omega$ is lower than $\omega 0$ (NO in step S510), the d-axis electric current command value Id* is set to 0 (step S512) and the process returns.

Figure 8:
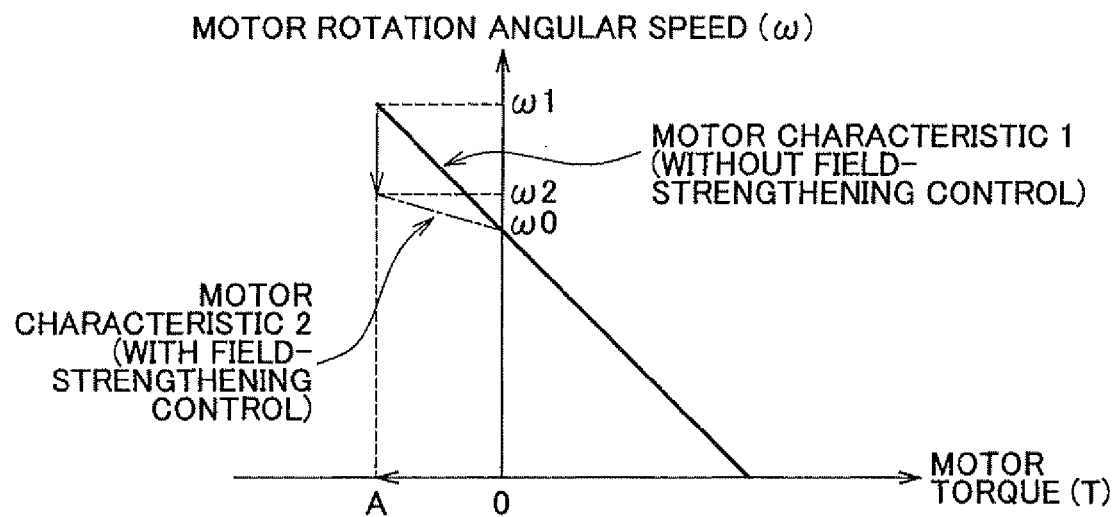
FIG. 8 is an explanatory diagram for illustrating an effect of the field strengthening.

Next, the effect of the field-strengthening control will be described with reference to FIG. 8. In FIG. 8, the horizontal axis indicates the motor torque (T) and the vertical axis indicates the motor rotation angular speed (ω). The solid line represents a motor characteristic 1 that is a motor characteristic exhibited when the field-strengthening control is not performed. The chain line represents a motor characteristic 2 that is a motor characteristic exhibited when the field-strengthening control is performed. For example, it is assumed that when the motor is rotating at a motor rotation angular speed ω lower than ω0 (motor characteristic 1), the steered wheel hits a curbstone and the abnormal external force application-determining section determines that an abnormal external force is applied. When the motor rotation angular speed then reaches ω0, the motor rotation angular speed-reducing section functions and the motor characteristic is changed from the motor characteristic 1 to the motor characteristic 2 (with field-strengthening control). As a result, the motor rotation angular speed that would increase to ω1 if the motor characteristic were the motor characteristic 1 (without field-strengthening control), stops increasing at ω2 because the motor characteristic is changed to the motor characteristic 2 (with field-strengthening control). Specifically, the motor rotation angular speed is reduced by (ω1−ω2). Because the motor rotation angular speed is reduced, the impulsive force applied to the torque transmitting member is suppressed.

Figure 9:
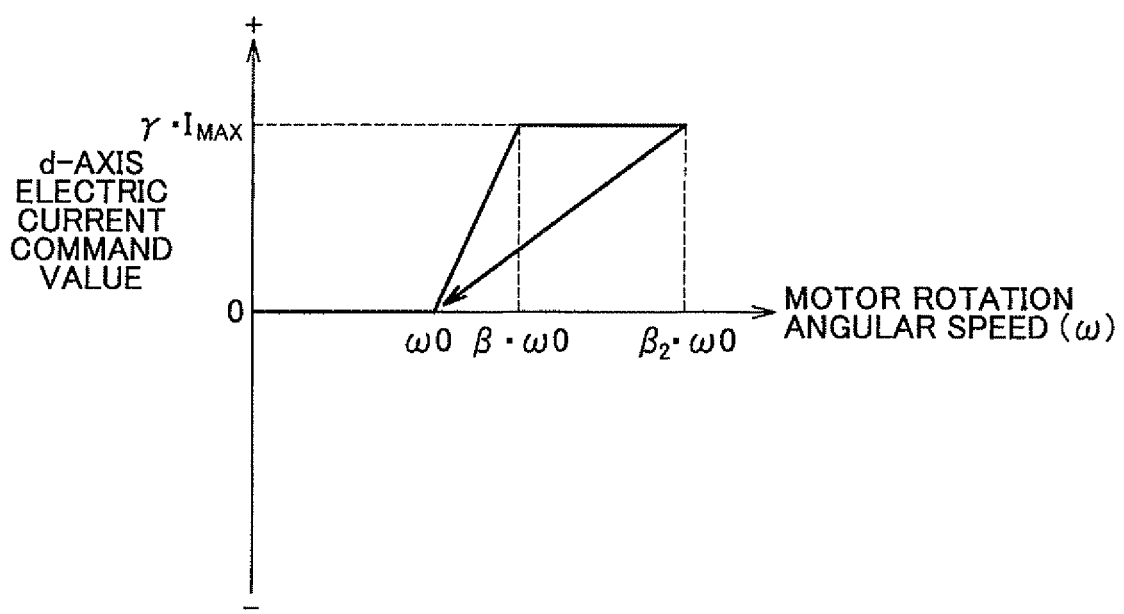
FIG. 9 is an explanatory diagram for illustrating another mode of the field strengthening.

This embodiment may be modified as follows. In this embodiment, when the motor rotation angular speed detected starts decreasing from the maximum motor rotation angular speed, the d-axis electric current command value is gradually reduced with the use of the same map as the above map. However, the gradual reduction of the d-axis electric current command value may be started simultaneously with the start of reducing the motor rotation angular speed, as shown in FIG. 9.

In this embodiment, the motor rotation angular speed-reducing section is included in the d-axis electric current command value-calculating section. However, the motor rotation angular speed-reducing section may be included in the motor control signal generating section.

In this embodiment, the invention is embodied in the form of a column-assisted EPS, the invention may be applied to a rack-assisted EPS or a pinion-assisted EPS.

What is claimed is:

1. An electric power steering system comprising:
   a motor that applies a steering assisting force to a steering mechanism;
   an electric current command value-calculating section that calculates an electric current command value that is used to control the motor;
   a motor control signal generating section that outputs a motor control signal based on the electric current command value calculated by the electric current command value-calculating section;
   a motor drive circuit that outputs electric power for drive to the motor based on the motor control signal;
   an abnormal external force application-determining section that determines whether an abnormal external force equal to or greater than a predetermined value is applied to a steered wheel based on one of or both of a motor rotation angular speed and a motor rotation angular acceleration of the motor; and
   a motor rotation angular speed-reducing section that outputs a speed reduction command value that is used to reduce a rotation angular speed of the motor when the abnormal external force application-determining section determines that the abnormal external force is applied.

2. The electric power steering system according to claim 1, wherein
   the motor rotation angular speed-reducing section gradually increases the speed reduction command value as the motor rotation angular speed increases.

3. The electric power steering system according to claim 2, wherein
   when the motor rotation angular speed reaches a predetermined value, the motor rotation angular speed-reducing section sets a threshold value of the speed reduction command value.

4. The electric power steering system according to claim 1, wherein:
   the electric current command value-calculating section has a d-axis electric current command value-calculating section that calculates, as the electric current command value, a d-axis electric current command value in a d/q coordinate system; and
   the d-axis electric current command value-calculating section has the motor rotation angular speed-reducing section that outputs a speed reduction command value that is used to perform field strengthening in the motor.

5. The electric power steering system according to claim 4, wherein
   the d-axis electric current command value-calculating section has the motor rotation angular speed-reducing section that performs control for the field strengthening and an ordinary control section that does not perform the control for the field strengthening, wherein switching between the motor rotation angular speed-reducing section and the ordinary control section is performed depending on whether the abnormal external force is applied that is determined by the abnormal external force application-determining section.

6. The electric power steering system according to claim 1, wherein
   when the motor rotation angular acceleration is equal to or higher than a predetermined threshold, the abnormal external force application-determining section determines that the abnormal external force is applied.

7. The electric power steering system according to claim 1, wherein
   when the motor rotation angular speed is equal to or higher than a predetermined threshold, the abnormal external force application-determining section determines that the abnormal external force is applied.

8. The electric power steering system according to claim 1, wherein
   when the motor rotation angular speed becomes equal to or higher than a no-load rotation speed, the motor rotation angular speed-reducing section outputs the speed reduction command value.

9. The electric power steering system according to claim 1, wherein
   the motor rotation angular speed-reducing section sets the speed reduction command value that is output, to zero on condition that the speed reduction command value is outputted and the motor rotation angular speed is thus reduced after reaching a maximum speed and again becomes a no-load rotation speed.

* * * * *